United States Patent
Kramer et al.

(10) Patent No.: US 9,399,697 B2
(45) Date of Patent: Jul. 26, 2016

(54) HARDENERS FOR EPOXY RESINS, WHICH COMPRISE AROMATIC AMINO GROUPS

(71) Applicant: SIKA TECHNOLOGY AG, Baar (CH)

(72) Inventors: Andreas Kramer, Zurich (CH); Edis Kasemi, Zurich (CH)

(73) Assignee: SIKA TECHNOLOGY AG, Baar (CH)

(*) Notice: Subject to any disclaimer, the term of this patent is extended or adjusted under 35 U.S.C. 154(b) by 66 days.

(21) Appl. No.: 14/354,985

(22) PCT Filed: Nov. 8, 2012

(86) PCT No.: PCT/EP2012/072198
§ 371 (c)(1),
(2) Date: Apr. 29, 2014

(87) PCT Pub. No.: WO2013/068507
PCT Pub. Date: May 16, 2013

(65) Prior Publication Data
US 2014/0275446 A1    Sep. 18, 2014

(30) Foreign Application Priority Data

Nov. 10, 2011 (EP) .................................. 11188690

(51) Int. Cl.
*C08G 59/50* (2006.01)
*C08L 63/00* (2006.01)
*C08L 63/02* (2006.01)
*C08G 59/18* (2006.01)

(52) U.S. Cl.
CPC .......... *C08G 59/5033* (2013.01); *C08G 59/182* (2013.01); *C08G 59/184* (2013.01); *C08G 59/50* (2013.01); *C08L 63/00* (2013.01)

(58) Field of Classification Search
None
See application file for complete search history.

(56) References Cited

U.S. PATENT DOCUMENTS

| 3,317,468 | A | 5/1967 | Griffith |
| 4,120,913 | A | 10/1978 | Petrie |
| 4,671,890 | A | 6/1987 | Yamaguchi et al. |
| 4,978,792 | A | 12/1990 | Nagata et al. |
| 6,096,744 | A | 8/2000 | Kornberg et al. |
| 2009/0163676 | A1 | 6/2009 | Vedage et al. |

OTHER PUBLICATIONS

Sigma-Aldrich, "3-aminobenzylamine," 2015, two pages.*
International Preliminary Report on Patentability issued in PCT/EP2012/072198 issued May 13, 2014.
International Search Report issued in International Patent Application No. PCT/EP2012/072198 dated Mar. 25, 2013.

* cited by examiner

*Primary Examiner* — Robert Sellers
(74) *Attorney, Agent, or Firm* — Oliff PLC

(57) ABSTRACT

The present invention relates to hardeners for epoxy resins, which contain secondary aliphatic and primary aromatic amino groups. They harden surprisingly quickly together with epoxy resins even under cold and humid conditions and without blushing effects to give films with a high degree of hardness. They are especially suitable for coatings with high resistance requirements.

14 Claims, No Drawings

HARDENERS FOR EPOXY RESINS, WHICH COMPRISE AROMATIC AMINO GROUPS

TECHNICAL FIELD

The invention relates to the area of amines as hardeners for epoxy resins as well as amine-containing epoxy resin compositions and the use thereof, especially as coatings.

PRIOR ART

Epoxy resin compositions should have a number of characteristics in order to be used as high-quality coatings. They should have low viscosity in order to be readily processed at ambient temperature and self-leveling, and they should cure quickly without so-called blushing effects, even under moist, cold conditions. "Blushing" is defined as hardening defects such as clouding, spots and rough or sticky surfaces caused by salt formation of amines with carbon dioxide ($CO_2$) from air; high atmospheric humidity and low temperatures promote the development of blushing effects. In the hardened state the epoxy resin coating should have a regular surface without clouding, spots or craters, and it should have high hardness and good resistance. To achieve these properties, diluents are usually used in epoxy resin coatings of the prior art. These diluents, for example benzyl alcohol or phenols, are not incorporated in the resin matrix during hardening and therefore can cause undesirable emissions.

US 2009/0163676 describes hardener compositions containing at least one benzylated polyalkylene-polyamine and at least one additional amine. Benzylation, however, greatly reduces the functionality of these amines and their reactivity toward epoxides.

For applications in which very high resistances are required, for example in corrosion protection, there is a need for very hydrophobic, highly cross-linked epoxy resin coatings. High-functionality hardeners according to the prior art, however, show a tendency toward strong blushing effects or have high viscosities. And aromatic amines suitable as hardeners for epoxy resins, known from the prior art, react only very slowly with epoxy resins and are often solid at room temperature, which makes their use in compounds applied at room temperature considerably more difficult and usually again requires the use of solvents.

PRESENTATION OF THE INVENTION

The goal of the present invention therefore is to make available a hardener for epoxy resins that is liquid at room temperature and does not have an excessively high viscosity, together with epoxy resins, is readily processable and can harden with them, even under cold and humid conditions, to form coatings of high hardness and high resistance quickly and without blushing Surprisingly it has been found that hardeners according to claim 1 containing amines with at least one amino group of formula (I) solve this problem. The hardeners according to claim 1 have low odor and are quite compatible with epoxy resins. Compared to the usual aromatic amine hardeners, known from the prior art, such as 4,4'-methylenediphenylamine or diethyltoluoylenediamine, they harden surprisingly quickly with epoxy resins, forming highly hydrophobic, strongly cross-linked materials, which are non-tacky, have a high luster and are free from opacities and surface irregularities. As a result, they are particularly suitable for applications in which high resistances are required, especially in corrosion protection. It is particularly advantageous that the amines with at least one amino group of formula (I), starting from commercially used aliphatic polyamines and nitrophenyl group-containing ketones or aldehydes in a simple process, since in this way the handling of small-molecule, usually highly toxic aromatic amines is avoided. Additional aspects of the invention form the subject matter of additional independent claims. Particularly preferred embodiments of the invention form the subject matter of the dependent claims.

METHODS OF PERFORMING THE INVENTION

The subject matter of the invention is a hardener, suitable for curing epoxy resins, containing at least one amine with at least one amino group of formula (I),

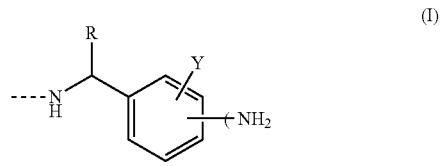

wherein
R represents a hydrogen atom or an alkyl group with 1 to 12 C atoms, preferably a hydrogen atom or a methyl group, especially a hydrogen atom;
Y represents either a hydrogen atom or a monovalent hydrocarbon group with 1 to 12 C atoms or an alkoxy or aryloxy group with 1 to 12 C atoms, preferably a hydrogen atom or a methyl group, especially a hydrogen atom; and
b is 1 or 2, preferably 1.

The broken lines in the formulas in this document in each case represent the bond between a substituent and the corresponding molecular radical.

Substance names beginning with "poly," such as polyamine, polyol or polyepoxide apply to substances which contain in their formula two or more of the functional groups present in their name per molecule.

"Aliphatic" is the name given to an amine, the amino group of which is bonded to an aliphatic, cycloaliphatic or arylaliphatic radical; correspondingly this group is called an aliphatic amino group.

"Aromatic" is the term applied to an amine, the amino group of which is bonded to an aromatic moiety; correspondingly, this group is called an aromatic amino group.

"amine hydrogens" is the name given to hydrogen atoms of primary and secondary amino groups.

A "non-incorporatable diluent" is the term applied to a substance that is soluble in an epoxy resin and lowers its viscosity but which is not covalently incorporated into the resin matrix during the hardening of the epoxy resin.

In the present document, the term "viscosity" applies to the dynamic viscosity or the shear viscosity, which is defined by the ratio between the shear stress and the shear rate (velocity gradient) and is determined as described in DIN EN ISO 3219.

Preferably the amine with at least one amino group of formula (I) has one, two or three, particularly preferably one or two, amino groups of formula (I).

Amines with two amino groups of formula (I) in the hardening with epoxy resins give particularly hydrophobic, strong and durable compounds with very high degrees of cross linking.

Amines with only one amino group of formula (I) have particularly low viscosities. In addition, they preferably have either at least one additional aliphatic secondary amino group, especially a benzylamino group, or they additionally have at least one primary aliphatic amino group.

Preferably Y represents a hydrogen atom and b represents 1, and the primary amino group is located in meta-position. Such an amino group of formula (I) represents an amino group of formula (1a).

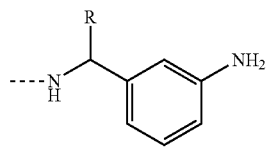

In formula (Ia), R has the meanings already mentioned. Amines with amino groups of formula (Ia) have particularly low viscosities.

The amine with at least one amino group of formula (I) is preferably an amine of formula (II),

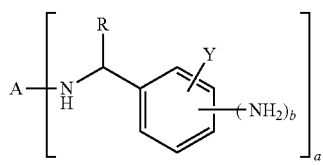

wherein
A represents an a-valent hydrocarbon moiety with a molecular weight in the range of 28 to 5000 g/mol, which optionally has ether groups, amino groups, hydroxyl groups or mercapto groups;
a represents an integer from 1 to 3, preferably 1 or 2; and
R, Y and b have the meanings indicated earlier.

Preferably A represents an a-valent hydrocarbon moiety with a molecular weight in the range of 28 to 500 g/mol, which optionally contains ether groups or primary or secondary amino groups.

Particularly preferably A represents either
an a-valent alkyl, cycloalkyl or arylalkyl moiety with 2 bis 20, especially 2 to 12, C atoms; or
an a-valent polyalkylene amine moiety with 1 to 10, especially 1 to 7, secondary amino groups, wherein the alkyls present are especially ethylene, n-propylene or hexamethylene; or
an a-valent polyoxyalkylene moiety with 1 to 7 ether groups, wherein the alkyls present are especially ethylene or isopropylene;
wherein these moieties may have one or two, preferably one, primary or secondary aliphatic amino groups.

Especially A represents the a-valent hydrocarbon moiety of an amines following removal of a primary aliphatic amino group, wherein the amine is selected from the group consisting of benzylamine, 3-aminomethylpyridine, 1,5-diamino-2-methylpentane (MPMD), 2-butyl-2-ethyl-1,5-pentanediamines (C11-neodiamines), 1,6-hexanediamines, 2,5-dimethyl-1,6-hexanediamines, 2,2,4- and 2,4,4-trimethylhexamethylenediamines (TMD), 1,12-dodecanediamines, 1,4-diaminocyclohexane, bis-(4-aminocyclohexyl)-methane, bis-(4-amino-3-methylcyclohexyl)-methane, 1-amino-3-aminomethyl-3,5,5-trimethylcyclohexane (=isophorone diamines or IPDA), 1,3-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0$^{2,6}$]decane, 1,3-bis-(amino-methyl)benzene, bis-hexamethylenetriamine (BHMT), diethylenetriamine (DETA), triethylenetetramine (TETA), tetraethylenepentamine (TEPA), pentaethylenehexamine (PEHA), polyethylenepolyamine with 5 to 7 ethyleneamine units (so-called "higher ethylenepolyamines," NEPA), dipropylenetriamine (DPTA), N-(2-aminoethyl)-1,3-propanediaminese (N3-amine), N,N'-bis(3-aminopropyl)ethylenediamine (N4-amine) and polyoxyalkylene diamines and polyoxyalkylene triamines with a molecular weight of 200 to 500 g/mol.

Amines of formula (II) with the preferred hydrocarbon moieties A are particularly compatible with epoxy resins.

In a very particularly preferred embodiment, A represents the hydrocarbon moieties of MPMD or 1,6-hexanediamines or TMD or 1,3-bis-(aminomethyl)benzene or 1,3-bis-(aminomethyl)cyclohexane or bis-(4-aminocyclohexyl)-methane or isophorone diamines. Amines of formula (II) with these moieties A result in high hardnesses and resistances when hardening epoxy resins.

In an additional, very particularly preferred embodiment, A represents the hydrocarbon moieties of DETA, TETA, TEPA, PEHA, HEPA, DPTA, N3-amine or N4-amine. Amines of formula (II) with these moieties A result in particularly high cross-linking densities in the hardening with epoxy resins.

In an additional, very particularly preferred embodiment, A represents the hydrocarbon moiety of a polyoxyalkylene diamine or polyoxyalkylene triamine with a molecular weight of 200 to 500 g/mol. Amines of formula (II) with these moieties A result in particularly high impact strengths in the hardening with epoxy resins. In an additional very particularly preferred embodiment, A in formula (II) represents the hydrocarbon moiety of benzylamine. This preferred moiety A yields amines of formula (II) with particularly low viscosities and in the hardening with epoxy resins, the coatings with high impart strengths achieved are not quite so highly cross-linked, Most preferably, A is the hydrocarbon moiety of MPMD or 1,3-bis-(aminomethyl)benzene. These preferred moieties A give amines of formula (II) with high functionality toward epoxide groups and particularly low viscosities.

The amine with at least one amino group of formula (I) can also be an adduct of an amine of formula (II) with at least one compound containing at least one, preferably at least two, reactive groups such as especially epoxide, episulfide, aziridine, cyclocarbonate, isocyanate, isothiocyanate, acrylate, methacrylate or acrylamide groups, preferably epoxide groups.

Preferably the amine of formula (II) has a viscosity, measured at 20° C., in the range of 150 to 50,000 mPa·s, particularly preferably in the range of 150 to 10,000 mPa·s, and especially in the range of 150 to 5000 mPa·s.

Furthermore the present invention relates to a method for producing a hardener as described in the preceding, wherein the amine with at least one amino group of formula (I) is obtained by reductive alkylation of at least one primary amine with at least one carbonyl compound of formula (III).

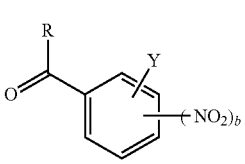

In formula (III), R, Y and b have the significances mentioned in the preceding.

Suitable carbonyl compounds of formula (III) are aldehydes, especially nitrobenzaldehyde, 3-nitrobenzaldehyde, 4-methyl-3-nitrobenzaldehyde, 4-ethyl-3-nitrobenzaldehyde and 4-nitrobenzaldehyde, and also ketones, especially 2'-nitroacetophenone, 3-nitroacetophenone, 3',5'-Dinitroacetophenone, 4'-methoxy-3-nitroacetophenone, 3'-nitropropiophenone, 4'-nitroacetophenone and 4'-nitropropiophenone.

Particularly preferred are 2-nitrobenzaldehyde, 3-nitrobenzaldehyde, 4-nitrobenzaldehyde, 2'-nitroacetophenone, 3'-nitroacetophenone and 4'-nitroacetophone.

Most preferred is 3-nitrobenzaldehyde.

The primary amine can also be reductively alkylated with a mixture of at least one carbonyl compound of formula (III) and at least one additional carbonyl compound, especially with a mixture containing benzaldehyde and/or salicylaldehyde and/pyridinecarbaldehyde.

The carbonyl compound is preferably used in a stoichiometric quantity relative to the primary amino groups, yielding amines with at least one amino group of formula (I) that are free from primary aliphatic amino groups.

Also preferably the carbonyl compound can be used in a slightly substoichiometric amount relative to the primary amino groups, especially in a range of 0.6 to 0.95. When primary aliphatic diamines are used as starting amines for reductive alkylation, mixtures of amines with two amino groups of formula (I) and amines with one amino group of formula (I) and one primary aliphatic amino group form. Such mixtures are of low viscosity, particularly highly reactive with epoxy resins, and scarcely exhibit blushing effects when hardened together with epoxy resins.

The reductive alkylation is suitably performed in the presence of hydrogen and under elevated pressure. It can be performed directly with molecular hydrogen or indirectly by hydrogen transfer from other reagents. Preferably, molecular hydrogen is used. In this process, not only do primary aliphatic amino groups undergo reductive alkylation, but also nitro groups that are present are reduced or hydrogenated to primary aromatic amino groups. The conditions are advantageously selected such that on one hand the primary aliphatic amino groups and the nitro groups are reductively alkylated as completely as possible, and on the other hand, insofar as possible, no other constituents of the amine and the carbonyl compound undergo hydrogenation or degradation. Preferably the process is performed at a hydrogen pressure of 5 to 100 bar, a temperature of 40 to 120° C. and in the presence of a suitable catalyst. Preferred catalysts are palladium on carbon (Pd/C), platinum on carbon (Pt/C), Adams catalyst and Raney nickel, especially palladium on carbon and platinum on carbon.

It has been found that under the above-mentioned conditions, the nitro groups are largely reduced or hydrogenated, and thus no or only small quantities of nitro group-containing compounds are detectable after the reductive alkylation.

An amine of formula (II) can especially advantageously be obtained by the reductive alkylation of an amine of formula (IV) with at least one carbonyl compound of formula (III).

  (IV)

In formula (IV), A and a have the previously mentioned significances.

In a first embodiment, particularly suitable amines of formula (IV) are primary aliphatic polyamines known as hardeners for epoxy resins, especially the following:

aliphatic, cycloaliphatic or arylaliphatic primary diamines, especially such as ethylenediamine, 1,2-propanediamines, 1,3-propanediamines, 2-methyl-1,2-propanediamines, 2,2-dimethyl-1,3-propanediamines, 1,3-butanediamines, 1,4-butanediamines, 1,3-pentanediamines (DAMP), 1,5-pentanedamines, 1,5-diamino-2-methylpentane (MPMD), 2-butyl-2-ethyl-1,5-pentanediamines (C11-neodiamines), 1,6-hexanediamines, 2,5-dimethyl-1,6-hexanediamines, 2,2,4- and 2,4,4-trimethylhexamethylenediamines (TMD), 1,7-heptanediamines, 1,8-octanediamines, 1,9-nonanediamines, 1,10-decanediamines, 1,1'-undecanediamines, 1,12-dodecanediamines, 1,2-, 1,3- and 1,4-diaminocyclohexane, bis-(4-aminocyclohexyl)-methane, bis-(4-amino-3-methylcyclohexyl)-methane, bis-(4-amino-3-ethylcyclohexyl)-methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophorone diamines or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4), 8(9)-bis-(aminomethyl)-tricyclo[5.2.1.0$^{2.6}$]decane, 1,4-diamino-2,2,6-trimethylcyclohexane (TMCDA), 1,8-menthanediamines, 3,9-bis-(3-aminopropyl)-2,4,8,10-tetraoxaspiro[5.5]undecane, 1,3-bis-(aminomethyl)benzene and 1,4-bis-(aminomethyl)benzene;

aliphatic, cycloaliphatic or arylaliphatic primary triamines such as 4-aminomethyl-1,8-octanediamines, 1,3,5-tris-(aminomethyl)benzene and 1,3,5-tris-(aminomethyl)cyclohexane;

ether group-containing aliphatic primary diamines, such as especially bis-(2-aminoethyl)ether, 3,6-dioxaoctane-1,8-diamines, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxamidecane-1,13-diamine and higher oligomers of these diamines, bis-(3-aminopropyl)polytetrahydrofurans and other poly-tetrahydrofurandiamines, as well as polyoxyalkylene-diamines. The latter are typically products from the amination of polyoxyalkylene diols and are, for example, available under the name of Jeffamines® (from Huntsman), under the name of polyether amines (from BASF) or under the name of PC Amines® (from Nitroil). Especially suitable polyoxyalkylene-diamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000;

primary polyoxyalkylene-triamines, which typically represent products from the amination of polyoxyalkylene-triols and for example are available under the name of Jeffamine® (from Huntsman), under the name of polyether amines (from BASF) or under the name of PC Amines® (from Nitroil), such as especially Jeffamine® T-403, Jeffamine® T-3000, Jeffamine® T-5000, Polyetheramin T 403, Polyetheramin T 5000 und PC Amine® TA 403;

tertiary amino group-containing polyamines with two primary aliphatic amino groups, such as especially N,N'-bis-(aminopropyl)piperazine, N,N-bis-(3-aminopropyl)methylamine, N,N-bis-(3-aminopropyl)ethylamine, N,N-bis-(3-aminopropyl)propylamine, N,N-bis-(3-aminopropyl)cyclohexylamine, N,N-bis-(3-aminopropyl)-2-ethyl-hexylamine, as well as the products of double cyanoethylation and subsequent reduction of fatty amines derived from natural fatty acids, such as N,N-bis-(3-aminopropyl)-dodecylamine and N,N-bis-(3-aminopropyl)-tallow alkylamine, available as Triameen® Y12D and Triameen® YT (from Akzo Nobel);

tertiary amino group-containing polyamines with three primary aliphatic amino groups, such as especially tris-(2-aminoethyl)amine, tris-(2-aminopropyl)amine und tris-(3-aminopropyl)amine;

secondary amino group-containing polyamines with two primary aliphatic amino groups, such as especially 3-(2-aminoethyl)aminopropylamine, bis-hexamethylenetriamine (BHMT), diethylenetriamine (DETA), triethylenetetramine (TETA), tetraethylenepentamine (TEPA), pentaethylenehexamine (PEHA) und higher homologs of linear polyethyleneamines such as polyethylenepolyamine with 5 to 7 ethyleneamine units (so-called "higher ethylenepolyamines," HEPA), products from the cyanoethylation or cyanobutylation and subsequent hydrogenation of primary di- and polyamines with at least two primary amino groups, such as dipropylenetriamine (DPTA), N-(2-aminoethyl)-1,3-propanediamine (N3-amine), N,N'-bis(3-aminopropyl)ethylenediamine (N4-amine), N,N'-bis-(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediaminea and N,N'-bis-(3-amino-1-ethylpropyl)-2-methyl-1,5-pentanediamine.

In an additional embodiment, suitable amines of formula (IV) are amines with only one primary aliphatic amino group, especially the following:

monoamines, such as especially benzylamine, 2-, 3- or 4-aminomethylpyridine, cyclohexylamine, 2-phenylethylamine, 2-methoxyphenylethylamine, 4-methoxyphenylethylamine, 3,4-dimethoxyphenylethylamine (homoveratrylamine), methylamine, ethylamine, propylamine, isopropylamine, 1- and 2-butylamine, isobutylamine, tert.-butylamine, 3-methyl-2-butylamine, 1-hexylamine, 1-octylamine, 2-ethyl-1-hexylamine, 2-methoxy-1-ethylamine, 2-ethoxy-1-ethylamine, 3-methoxy-1-propylamine, 3-ethoxy-1-propylamine, 3-(2-ethylhexyloxy)-propylamine, and 3-(2-methoxyethoxy)propylamine;

primary and secondary amino group-containing polyamines, such as especially N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethyl-piperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines such as N-cocoalkyl-1,3-propanediamines and products from the Michael-type addition reaction of primary aliphatic diamines with acrylonitrile, maleic or fumaric acid diesters, citraconic acid diesters, acrylic and methacrylic acid esters, acrylic and methacrylic acid amines and itaconic acid diesters in a 1:1 molar ratio;

primary and tertiary amino group-containing polyamines, especially 3-(dimethylamino)-1-propylamine;

amino alcohols, especially 3-amino-1-propanol, 2-amino-1-butanol, 6-amino-1-hexanol, aminopropyl diethanolamine (APDEA), 4-(2-aminoethyl)-2-hydroxy-ethylbenzene, 3-aminomethyl-3,5,5-trimethyl-cyclohexanol, 2-(2-aminoethoxy)-ethanol, 2-(2-(2-aminoethoxy)ethoxy)-ethanol, 3-(2-hydroxyethoxy)-propylamine and 3-(2-(2-hydroxyethoxy)-ethoxy)-propylamine;

aminomercaptans, especially 2-aminoethanethiol (cysteamine), 3-aminopropanethiol, 4-amino-1-butanethiol and 6-amino-1-hexanethiol.

Preferred amines of formula (IV) are amines with a molecular weight of up to 500 g/mol, also optionally containing ether groups.

Particularly preferred is the amine of formula (IV) selected from the group consisting of benzylamine, 3-aminomethylpyridine, MPMD, C11-neodiamine, 1,6-hexanediamine, 2,5-dimethyl-1,6-hexanediamine, TMD, 1,12-dodecanediamine, 1,4-diaminocyclohexane, bis-(4-aminocyclohexyl)-methane, bis-(4-amino-3-methyl-cyclohexyl)-methane, isophorone diamine, 1,3-bis-(aminomethyl)cyclohexane, NBDA, 3 (4),8(9)-bis-(aminomethyl)tricyclo[$5.2.1.0^{2,6}$]decane, 1,3-bis-(aminomethyl)-benzene, BHMT, DETA, TETA, TEPA, PEHA, HEPA, DPTA, N3-amine, N4-amine, polyoxyalkylene diamines and polyoxyalkylene triamines with molecular weight of 200 to 500 g/mol, especially the commercial types Jeffamine® D-230, Jeffamine® D-400 and Jeffamine® T-403 (from Huntsman).

The production of amines with at least one amino group of formula (I) by reductive alkylation in the manner described is particularly advantageous for their use as hardeners for epoxy resins, since primary aliphatic amino groups are alkylated highly selectively, whereas secondary aliphatic amino groups are scarcely alkylated further. The products from the manufacturing described can therefore be used after reductive alkylation without additional workup for hardening epoxy resins in the manner described. Also advantageous during the production in the manner described is the fact that in this process no handling of small-molecule, usually toxic aromatic amines is necessary, so that the manufacturer is not exposed to any risk and also no residues of such substances can remain behind in the hardener.

An additional object of the invention is the use of the hardener described for hardening at least one epoxy resin. For this purpose, the hardener is mixed with the epoxy resin in an appropriate manner.

The hardener described has particularly advantageous properties. It has low volatility and low odor, and its reactivity toward $CO_2$ is so low that—in contrast to many hardeners known from the prior art—it does not have a tendency to form crusts or precipitates or to undergo viscosity increases when in contact with air. The hardener is quite compatible with the usual commercial epoxy resins, easy to handle, and hardens rapidly and without unwanted blushing effects at ambient temperature, forming highly hydrophobic, highly cross-linked compositions of high hardness and excellent resistances. In comparison to aromatic amine hardeners from the prior art, such as 4,4'-methylenediphenyldiamine or diethyltoluoylenediamine, the hardeners described harden surprisingly rapidly with epoxy resins. Compared to hardeners with secondary amino groups known from the prior art, obtained from the alkylation of primary amino groups, the hardener according to the invention exhibits numerous advantages. Alkylation of, for example, a primary diamine, reduces its functionality with respect to epoxide groups from four to two. Thus hardened epoxy resins with a relatively high hardener content in parts by weight and with only a low cross-linking density can be obtained. If, however, a primary diamine for example is converted into an amine with two amino groups of formula (I), its functionality increases from four to six. Epoxy resins hardened in this way have a high cross=linking density, and their content of hardeners in parts by weight is comparatively low. Because of the presence of at least one amine with at least one amino group of formula (I), the hardener described is especially suitable for formulating low-emission, rapidly hardening epoxy resin compositions that can be applied at room temperature, which in the hardened state have high hardness, high cross=linking density, high hydrophobicity and resistance.

Preferably the amine with at least one amino group of formula (I) is not an aminobenzylamine.

The hardeners described, in addition to the amine with at least one amino group of formula (I) may contain additional compounds suitable for the hardening of epoxy resins, especially the following;

the previously described amines of formula (IV);

secondary aliphatic polyamines, especially such as the products from the reductive alkylation of the previously described amines of formula (IV) with other carbonyl compounds, especially with benzaldehyde and/or salicylaldehyde and/or 3-nitropyridinaldehyde and/or 4-dimethylaminobenzaldehyde; also N,N'-dibutyl-ethylenediamine, N,N'-di-tert.butyl-ethylenediamine, N,N'-diethyl-1,6-hexanediamine, 1-(1-methylethylamino)-3-(1-methylethyl-aminomethyl)-3,5,5-trimethylcyclohexane (Jefflink® 754 from Huntsman), $N^4$-cyclohexyl-2-methyl-N2-(2-methylpropyl)-2,4-pentanediamines, N,N'-dialkyl-1,3-bis-(aminomethyl) benzene, especially N,N'-dibenzyl-1,3-bis-(aminomethyl)benzene, bis-(4-(N-3-butylamino)-cyclohexyl)methane (Clearlink® 1000 from UOP), dialkylated DETA or TETA or TEPA or PEHA or N3- or N4-amine, especially the dibenzylated, possibly phenol group-containing types, and also styrenated polyamines, for example styrenated 1,3-bis-(aminomethyl)benzene, commercially available as Gaskamine® 240 (from Mitsubishi Gas Chemical), N-alkylated polyether amines, for example the Jeffamine® types SD-231, SD-401, ST-404 and SD-2001 (from Huntsman), as well as products from the Michael-type addition reaction of primary aliphatic polyamines with Michael acceptors such as maleic acid diesters, fumaric acid diesters, citraconic acid diesters, acrylic acid esters, methacrylic acid esters, cinnamic acid esters, itaconic acid diesters, vinylphosphonic acid diesters, vinylsulfonic acid aryl esters, vinylsulfones, vinyl nitriles, nitroalkylenes or Knoevenagel condensation products, for example those made from malonic acid diesters and aldehydes such as formaldehyde, acetaldehyde or benzaldehyde;

aromatic polyamines, such as especially m- and p-phenylenediamine, 4,4'-, 2,4'-und 2,2'-diaminodiphenylmethane, 3,3'-dichloro-4,4'-diaminodiphenylmethane (MOCA), 2,4- and 2,6-toluoylenediamine, mixtures of 3,5-dimethylthio-2,4- and -2,6-toluoylenediamine (available as Ethacure® 300 from Albemarle), mixtures of 3,5-diethyl-2,4- and -2,6-toluoylenediamine (DETDA), 3,3',5,5'-tetraethyl-4,4'-diaminodiphenylmethane (M-DEA), 3,3',5,5'-tetraethyl-2,2'-dichloro-4, 4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS),4-amino-N-(4-aminophenyl)benzene sulfonamide, 5,5'-methylenedianthranilic acid, dimethyl-5,5'-methylenedianthranilate, 1,3-propylene-bis-(4-aminobenzoate), 1,4-butylene-bis-(4-aminobenzoate), poly-tetramethyleneoxide-bis-(4-aminobenzoat) (available as Versalink® from Air Products), 1,2-bis-(2-aminophenylthio)ethane, 2-methylpropyl-(4-chloro-3,5-diaminobenzoate) and tert.butyl-(4-chloro-3,5-diaminobenzoate);

amine/epoxide adducts, especially adducts of the amines mentioned with diepoxides in a molar ratio of at least 2/1, especially in a molar ratio of 2/1 to 6/1, or with monoepoxides in a molar ratio of at least 1/1, as well as reaction products from amines and epichlorohydrin, especially that of 1,3-bis-(aminomethyl)benzene, commercially available as Gaskamine® 328 (from Mitsubishi Gas Chemical);

polyamidoamines which are reaction products of a monovalent or polyvalent carboxylic acid, or the esters or anhydrides thereof, especially a dimer fatty acid, and an aliphatic, cycloaliphatic or aromatic polyamine, especially a polyalkyleneamine such as DETA or TETA, used in stoichiometric excess, especially the commercially available polyamidoamines Versamid® 100, 125, 140 and 150 (from Cognis), Aradur® 223, 250 and 848 (from Huntsman), Euretek® 3607 and 530 (from Huntsman) and Beckopox® EH 651, EH 654, EH 655, EH 661 and EH 663 (from Cytec);

Mannich bases, some of which are also known as phenalkamines, which are reaction products from a Mannich reaction of phenols, especially cardanol, nonylphenol or tert.butylphenol, with aldehydes, especially formaldehyde, and polyamines, especially the commercially available Mannich bases Cardolite® NC-541, NC-557, NC-558, NC-566, Lite 2001 and Lite 2002 (from Cardolite), Aradur® 3440, 3441, 3442 and 3460 (from Huntsman), Accelerator 2950 (from Huntsman) and Beckopox® EH 614, EH 621, EH 624, EH 628 and EH 629 (from Cytec);

liquid mercaptan-terminated polysulfide polymers, known under the trade names Thiokol® (from Morton Thiokol; available for example from SPI Supplies or from Toray Fine Chemicals), especially the types LP-3, LP-33, LP-980, LP-23, LP-55, LP-56, LP-12, LP-31, LP-32 and LP-2; and also known under the trade names Thioplast® (from Akzo Nobel), especially the types G 10, G 112, G 131, G 1, G 12, G 21, G 22, G 44 and G 4;

Mercaptan-terminated polyoxyalkylene ethers, available for example by reacting polyoxyalkylene di- and -triols either with epichlorohydrin or with an alkylene oxide, followed by sodium hydrogen sulfide;

mercaptan-terminated compounds in the form of polyoxyalkylene-derivatives, known under the trade names of Capcure® (from Cognis), especially the types WR-8, LOF and 3-800;

polyesters of thiocarboxylic acids, for example pentaerythritol tetramercaptoacetate, trimethylolpropane trimercaptoacetate, glycol dimercaptoacetate, pentaerythritol tetra-(3-mercaptopropionate), trimethylolpropane-tri-(3-mercaptopropionate) and glycoldi-(3-mercaptopropionate), as well as the esterification products of polyoxyalkylene diols and triols, ethoxylated trimethylolpropane and polyester diols with thiocarboxylic acids such as thioglycolic acid and 2- or 3-mercaptopropionic acid;

additional mercapto group-containing compounds, such as especially 2,4,6-trimercapto-1,3,5-triazine, 2,2'-(ethylenedioxy)diethanethiol (triethylene glycol dimercaptan) and ethanedithiol.

Preferred among these are DAMP, MPMD, C11-neodiamine, 1,6-hexanediamine, 2,5-dimethyl-1,6-hexanediamine, TMD, 1,12-dodecanediamine, 1,4-diaminocyclohexane, bis-(4-aminocyclohexyl)methane, bis-(4-amino-3-methylcyclohexyl)-methane, IPDA, 3(4),8(9)-bis-(aminomethyl)-tricyclo[5.2.1.0$^{2,6}$]decane, 1,3-bis-(aminomethyl)benzene, N,N'-dibenzyl-1,3-bis-(aminomethyl)benzene, 1,3-bis-(aminomethyl)cyclohexane, Gaskamine® 240, NBDA, dibenzylated DETA, dibenzylated TETA, dibenzylated N3-amines and dibenzylated N4-amines, wherein these dibenzylated amines optionally contain phenol groups, polyoxyalkylene diamines and triamines with molecular weight in the range of 200 to 500 g/mol, especially the types Jeffamine® D-230, Jeffamine® D-400 and Jeffamine® T-403, and also amine/epoxide adducts, especially Gaskamine® 328, as well as Mannich bases.

The hardener according to the invention can also contain at least one accelerator. Suitable accelerators are substances that accelerate the reaction between amino groups and epoxide groups, especially acids or compounds that can be hydrolyzed to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids such as especially phosphoric acid, or mixtures of the above-mentioned acids and acid esters; also tertiary amines such as especially 1,4-diazabicyclo[2.2.2]octane, benzyldimethylamine, α-methylbenzyldimethylamine, triethanolamine, dimethylaminopropylamine, imidazoles such as especially N-methylimidazole, N-vinylimidazole or 1,2-dimethylimidazole, salts of such tertiary amines, quaternary ammonium salts, such as especially benzyl-trimethylammonium chloride, amidines such as especially 1,8-diazabicyclo[5.4.0]-undec-7-ene, guanidines such as especially 1,1,3,3-tetramethylguanidine, phenols, especially bisphenols, phenol resins and Mannich bases such as especially 2-(dimethylaminomethyl)phenol, 2,4,6-tris-(dimethylaminomethyl)phenol and polymers made from phenol, formaldehyde and N,N-dimethyl-1,3-propanediamines, phosphites such as especially di- and triphenyl phosphites, as well as mercapto group-containing compounds, such those mentioned in the preceding.

The hardener according to the invention can also contain at least one non-incorporatable diluent, such as especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butylyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, petroleum fractions such as Solvesso®-types (from Exxon), alkylphenols such as ter-t.butylphenol, nonylphenol, dodecyl phenol and 8,11,14-pentadecatrienylphenol (cardanol, from cashew shell oil, available for example as Cardolite NC-700 from Cardolite Corp., USA), styrenated phenol, bisphenols, aromatic hydrocarbon resins, especially phenol group-containing types, adipates, sebacates, phthalates, benzoates, organic phosphoric and sulfonic acid esters and sulfonamides. Preferred are benzyl alcohol, dodecylphenol, tert.butylphenol, styrenated phenol and phenol group-containing aromatic hydrocarbon resins, especially the Novares®-types LS 500, LX 200, LA 300 and LA 700 (from Rütgers).

Preferably the hardener contains no or only a low content of non-incorporatable diluents, particularly preferably less than 25% by weight especially less than 15% by weight and most preferably less than 5% by weight. In particular, no non-incorporatable diluents are added to the hardener.

An additional object of the invention is an epoxy resin composition containing at least one epoxy resin and at least one hardener as described in the preceding.

Suitable epoxy resins are the usual industrial epoxy resins. These are obtained in the known ways, for example from oxidation of the corresponding olefins or from the reaction of epichlorohydrin with the corresponding polyols, polyphenols or amines. Particularly suitable epoxy resins are so-called polyepoxide liquid resins, called "liquid resin" in the following. These have a glass transition temperature of less than 25° C., in contrast to the so-called solid resins, which have a glass transition temperature of more than 25° C. and can be ground into powders that are free flowing at 25° C.

In one embodiment the liquid resin is an aromatic polyepoxide. Suitable for this purpose for example are liquid resins of formula (V),

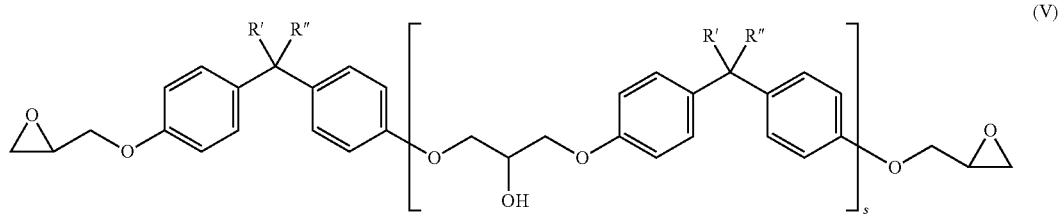

(V)

wherein R' and R" each independently of one another represents a hydrogen atom or a methyl group, and s on average has a value of 0 to 1. Preferred are liquid resins of formula (V) in which the subscript s on average represents a value of less than 0.2.

The liquid resins of formula (V) are diglycidyl ethers of bisphenol A, bisphenol F and bisphenol A/F, wherein A represents acetone and F represents formaldehyde, which serve as educts for producing these bisphenols. In the case of bisphenol F, positional isomers may also be present, especially those derived from 2,4'- and 2,2'-hydroxyphenylmethane.

Additional suitable aromatic liquid resins are the glycidylation products of

Dihydroxybenzene derivatives such as resorcinol, hydroquinone and pyrocatechol;

additional bisphenols or polyphenols such as bis-(4-hydroxy-3-methylphenyl)-methane, 2,2-bis-(4-hydroxy-3-methylphenyl)-propane (bisphenol C), dimethyl-4-hydroxyphenyl)-methane, 2,2-bis-(3,5-dimethyl-4-hydroxyphenyl)-propane, 2,2-bis-(3,5-dibromo-4-hydroxyphenyl)-propane, 2,2-bis-(4-hydroxy-3-tert.-butylphenyl)-propane, 2,2-bis-(4-hydroxyphenyl)-butane (bisphenol B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol Z),1,1-bis-(4-hydroxyphenyl)-3,3,5-trimethylcyclohexane (bisphenol TMC), 1,1-bis-(4-hydroxyphenyl)-1-phenylethane, 1,4-bis-[2-(4-hydroxyphenyl)-2-propyl]benzene) (bisphenol 1,3-bis-[2-(4-hydroxyphenyl)-2-propyl]benzene) (bisphenol M), 4,4'-dihydroxydiphenyl (DOD), 4,4'-dihydroxy-benzophenone, bis-(2-hydroxynaphth-1-yl)-methane, bis-(4-hydroxynaphth-1-yl)-methane, 1,5-dihydroxy-naphthalene, tris-(4-hydroxyphenyl)methane, 1,1,2,2-tetrakis-(4-hydroxyphenyl)ethane, bis-(4-hydroxyphenyl)ether, bis-(4-hydroxyphenyl)sulfone;

Condensation products of phenols with formaldehyde obtained under acidic conditions, such as phenol-Novolacs or cresol-Novolacs, also known as F-Novolacs;

aromatic amines, such as aniline, toluidine, 4-aminophenol, 4,4'-methylendiphenyldiamine, 4,4'-methylendiphenyldi-(N-methyl)amine, 4,4'-[1,4-phenylene-bis-(1-methylethylidene)]bisaniline (Bisaniline-P), 4,4'-[1,3-phenylene-bis-(1-methylethyliden)]-bisaniline (Bisaniline-M).

Other suitable epoxy resins are aliphatic or cycloaliphatic polyepoxides, for example a glycidyl ether of a saturated or unsaturated, branched or unbranched, cyclic or open-chain $C_2$- to $C_{30}$ diol, for example ethylene glycol, propylene glycol, butylene glycol, hexanediol, octanediol, a polypropylene glycol, dimethylolcyclohexane, neopentyl glycol or dibromo-neopentyl glycol;

a glycidyl ether of a tri- or tetrafunctional, saturated or unsaturated, branched or unbranched, cyclic or open-chain polyol such as castor oil, trimethylolpropane, trimethylolethane, pentaerythrol, sorbitol or glycerol, as well as alkoxylated glycerol or alkoxylated trimethylolpropane;

a hydrogenated bisphenol-A, -F or -A/F liquid resin, or the glycidylation products of hydrogenated bisphenol A, -F or -A/F;

an N-glycidyl derivative of amides or heterocyclic nitrogen bases, such as triglycidyl cyanurate and triglycidyl isocyanurate, as well as reaction products of epichlorohydrin and hydantoin.

Other possible epoxy resins are solid resins based on bisphenol-A, -F or -A/F of similar composition to the above-mentioned liquid resins of formula (V), but with the subscript s instead having a value of 2 to 12, and having a glass transition temperature above 25° C.

Finally, other suitable epoxy resins are epoxy resins from the oxidation of olefins, for example from the oxidation of vinylcyclohexene, dicyclopentadiene, cyclohexadiene, cyclododecadiene, cyclododecatriene, isoprene, 1,5-hexadiene, butadiene, polybutadiene or divinylbenzene.

Preferred epoxy resins are liquid resins on the basis of a bisphenol, especially on the basis of bisphenol A, bisphenol F or bisphenol A/F, such as those commercially available, for example, from Dow, Huntsman and Hexion. These liquid resins have a low viscosity for epoxy resins and in the hardened state, have good properties as coatings. They may optionally be present in combination with bisphenol A solid resin or bisphenol F Novolac-epoxy resin.

The epoxy resin may contain a reactive diluent, especially a reactive diluent containing at least one epoxide group. Suitable reactive diluents are, for example, the glycidyl ethers of mono- or polyvalent phenols and aliphatic or cycloaliphatic alcohols, especially the previously mentioned polyglycidyl ethers of di- or polyols, as well as especially phenylglycidyl ether, cresylglycidyl ether, benzylglycidyl ether, p-n-butyl-phenylglycidyl ether, p-tert.butyl-phenylglycidyl ether, nonylphenylglycidyl ether, allylglycidyl ether, butylglycidyl ether, hexylglycidyl ether, 2-ethylhexylglycidyl ether, as well as glycidyl ethers of natural alcohols, such as $C_8$- to $C_{10}$-alkylglycidyl ethers or $C_{12}$- to $C_{14}$-alkylglycidyl ethers. The addition of a reactive diluent to the epoxy resin brings about a reduction of the viscosity, as well as—in the hardened state of the epoxy resin composition—a reduction in the glass transition temperature and the mechanical values.

Optionally the epoxy resin composition contains additional components, especially auxiliary substances and additives usually used in epoxy resin compositions, such as the following:

solvents, diluents, film forming aids or extenders, especially for example the previously mentioned non-incorporatable diluents;

reactive diluents, especially epoxide group-containing reactive diluents, such as those previously mentioned, epoxidized soybean oil or linseed oil, acetoacetate group-containing compounds, especially acetoacetylated polyols, butyrolactone, carbonates, aldehydes, as well as isocyanates and reactive group—containing silicones;

polymers, for example polyamides, polysulfides, polyvinylformal (PVF), poly-vinylbutyral (PVB), polyurethanes (PUR), polymers with carboxyl groups, polyamides, butadiene-acrylonitrile copolymers, styrene-acrylonitrile copolymers, butadiene-styrene copolymers, homo- or copolymers of unsaturated monomers, especially from the group comprising ethylene, propylene, butylene, isobutylene, isoprene, vinyl acetate and alkyl(meth)acrylates, especially chlorosulfonated polyethylenes and fluorine-containing polymers, sulfonamide-modified melamine and purified montan wax;

inorganic and organic fillers, for example ground or precipitated calcium carbonates, optionally coated with fatty acids, especially stearates, barytes (heavy spar), talcs, silica flour, quartz sand, micaceous iron ore, dolomites, wollastonites, kaolins, mica (potassium-aluminum silicate), molecular sieves, aluminum oxides, aluminum hydroxides, magnesium hydroxide, silicas, cements, gypsums, fly ash, carbon black, graphite, powdered metals such as aluminum, copper, iron, zinc, silver or steel, PVC powder or hollow beads;

fibers, especially glass fibers, carbon fibers, metal fibers, ceramic fibers or plastic fibers such as polyamide fibers or polyethylene fibers;

pigments, especially titanium dioxide and iron oxides;

the above-mentioned accelerators;

rheology modifiers, especially thickeners, for example phyllosilicates such as bentonites, castor oil derivatives, hydrogenated castor oil, polyamides, polyurethanes, urea compounds, pyrogenic silicas, cellulose ethers and hydrophobically modified polyoxyethylenes;

adhesion promoters, for example organoalkoxysilanes such as aminosilanes, mercaptosilanes, epoxysilanes, vinylsilanes, (meth)acrylsilanes, isocyanatosilanes, carbamatosilanes, alkylsilanes, S-(alkylcarbonyl)mercaptosilanes and aldiminosilanes, as well as oligomeric forms of these silanes, especially 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-isocyanatopropyltrimethoxysilans, 3-ureido-propyltrimethoxysilane, 3-chloropropyltrimethoxysilane, vinyltrimethoxysilane, or the corresponding organosilanes with ethoxy groups instead of the methoxy groups;

stabilizers against oxidation, heat, light and UV radiation;

flame retardant substances, especially compounds such as aluminum hydroxide ($Al(OH)_3$; also called ATH for "aluminum trihydrate"), magnesium hydroxide ($Mg(OH)_2$; also called MDH for "magnesium dihydrate"), ammonium sulfate (($NH_4)_2SO_4$), boric acid ($B(OH)_3$), zinc borate, zinc phosphate, melamine borate and melamine cyanurate; phosphorus-containing compounds such as ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl)phosphate, trioctyl phosphate, mono-, bis- and tris-(isopropyl phenyl)phosphate, resorcinol-bis(diphenyl phosphate), resorcinol diphosphate oligomers, tetraphenyl-resorcinol diphosphite, ethylenediamine diphosphate and bisphenol A bis(diphenyl phosphate); halogen-containing compounds such as chloroalkyl phosphates, especially tris-(chloroethyl) phosphate, tris-(chloropropyl)phosphate and tris-(dichloroisopropyl)-phosphate, polybrominated diphenyl ether, especially decabromo diphenyl ether, polybrominated diphenyl oxide, tris-[3-bromo-2,2-bis(bromo-methyl)propyl]phosphate, tetrabromo-bisphenol A, bis-(2,3-dibromopropylether) of bisphenol A, brominated epoxy resins, ethylene-bis(tetrabromophthalimide), ethylene-bis(dibromonorbornane dicarboximide), 1,2-bis-(tribromophenoxy)-ethane, tris-(2,3-dibromopropyl)isocyanurate, tribromophenol, hexabromocyclododecane, bis-(hexachlorocyclopentadieno)cyclooctane and chloroparaffins; as well as combinations of a halogen-containing compound and antimony trioxide ($Sb_2O_3$) or antimony pentoxide ($Sb_2O_5$);

surface-active substances, especially wetting agents, leveling agents, deaerating agents and defoamers;

Biocides, for example algicides, fungicides or fungal growth inhibiting substances.

Preferably the epoxy resin composition contains additional auxiliaries and additives, especially wetting agents, leveling agents, defoamers, stabilizers, pigments and catalysts, especially salicylic acid or 2,4,6-tris-(dimethylaminomethyl)phenol. Preferably the epoxy resin composition contains no or only a small amount of non-incorporatable diluents, particularly preferably less than 10% by weight, especially less than 5% by weight, most preferably less than 2% by weight.

In the epoxy resin composition, the ratio of the number groups reactive toward epoxide groups versus the number of epoxide groups falls in the range of 0.5 to 1.5, preferably 0.7 to 1.2.

The amine hydrogens present in the epoxy resin composition and additional optionally present groups reactive toward epoxide groups react with the epoxide groups with ring opening of the latter (addition reaction). As a result of these reactions, the composition polymerizes and finally hardens. The person skilled in the art is aware of the fact that primary amino groups are difunctional relative to epoxide groups and thus one primary amino group counts as two groups reactive toward epoxide groups.

In particular, the epoxy resin composition is a two-component composition, consisting of a resin component and a hardener component, wherein the epoxy resin is a constituent of the resin component and the hardener described is a constituent of the hardener component.

The components of the two-component are each stored in their own drums. Additional components of the two-component epoxy resin composition can be present as a constituent of the resin or the hardener component, wherein additional components reactive toward epoxide groups are preferably constituents of the hardener component. A suitable drum for storing the resin or the hardener component is especially a barrel, a hobbock, a bag, a bucket, a canister, a cartridge or a tube. The components are suitable for storage, in other words, they can be stored for months to a year or more before use without their respective properties changing to a degree relevant for their use. To use the two-component epoxy resin composition, the resin component and the hardener component are mixed together shortly before or during application. The mixing ratio between the two components is preferably selected such that the groups of the hardener component reactive toward epoxide groups are in a suitable ratio to the epoxide groups of the resin component, as described in the preceding. In parts by weight, the mixing ratio between the resin component and the hardener component is usually in the range of 1:10 to 10:1. The two components are mixed using a suitable method; it may take place continuously or batchwise. If the mixing takes place before application, it is necessary to make sure that excessive time does not lapse between the mixing of the components and the application, since this could result in problems, for example slow or incomplete buildup of the adhesion to the substrate. The mixing especially takes place at ambient temperature, which typically falls in the range of about 5 to 50° C., about 10 to 30° C.

With the mixing of the two components, the hardening by chemical reaction begins, as described in the preceding. The hardening takes place especially at ambient temperature. It typically takes several days to weeks before becoming largely complete under the given conditions. The duration depends, among other things, upon the temperature, the reactivity of the components and their stoichiometry as well as the presence of accelerators.

An additional object of the invention is thus a hardened composition obtained from the hardening of an epoxy resin composition as described in the present document.

The application of the epoxy resin composition takes place on at least one substrate, wherein the following are particularly suitable:

glass, glass ceramic, concrete, mortar, brick, tile, plaster and natural stone such as granite or marble;

metals and alloys, such as aluminum, iron, steel and non-ferrous metals, as well as surface-coated metals and alloys, such as zinc-plated or chrome-plated metals;

leather, textiles, paper, wood, wood products bonded with resins, for example phenol, melamine or epoxy resins, resin-textile composite materials and additional so-called polymer composites;

plastics, such as polyvinyl chloride (hard and soft PVC), acrylonitrile-butadiene-styrene copolymers (ABS), polycarbonate (PC), polyamide (PA), polyester, poly (methylmethacrylate) (PMMA), polyester, epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the plastics can preferably be surface-treated with plasma, corona or flames;

fiber-reinforced plastics, for example plastics, such as carbon-fiber reinforced plastics (CFK), glass fiber-reinforced plastics (GFK) and Sheet Moulding Compounds (SMC);

coated substrates, such as powder-coated metals or alloys;

paints and lacquers, especially automobile top coat lacquers.

The substrates can, if necessary, be pretreated before application of the epoxy resin composition. Such pretreatments comprise especially physical and/or chemical cleaning methods, for example grinding, sand-blasting, shot-blasting, brushing or the like, wherein dust produced in the process is advantageously vacuumed off, as well as treatment with cleaners or solvents or the application of an adhesion promoter, an adhesion promoter solution or a primer.

The epoxy resin composition described is advantageously usable as a fiber composite material (composite), potting compound, sealant, adhesive, lining, coating, paint, lacquer, sealant, undercoat or primer.

It is especially usable as a potting compound, sealant and adhesive, for example as an electrical potting composition, pore filler, bodywork adhesive, sandwich element adhesive, half-shell adhesive, for example for rotor blades of wind power plants, bridge element adhesive or anchoring adhesive, and also as a lining, coating, paint, lacquer, sealant, undercoat and primer for construction and industrial applications, especially as floor covering and floor coating for interior rooms such as offices, industrial halls, gymnasia or cold rooms, or in the outdoor area for balconies, terraces, parking lots, bridges or roofs, as a protective coating for concrete, metals, plastics or wood, for example for surface sealing of wood structures, vehicles, loading platforms, tanks, silos, shafts, ducts, pipelines, machine or steel constructions, for example of ships, piers, offshore platforms, lock gates, hydro power plants, stream works, swimming pools, wind power plants, bridges, chimneys, cranes or bulkheads, wherein these coatings protect the respective substrates especially from corrosion, abrasion and the effects of, moisture, water and/or salts or chemicals; and furthermore as a precoat, holding primer, anticorrosion primer or to make surfaces water-repellent. The composition described is also especially suitable as a coating for so-called heavy corrosion protection in and on water, especially in and on seawater. Especially when it is used as a coating, lining or paint, an additional coating or an additional paint may be applied to the completely or partially hardened epoxy resin composition, wherein this additional layer may likewise be an epoxy resin composition, but may also be made of another material, especially a polyurethane or polyurea coating.

The epoxy resin composition described is particularly advantageously usable as a coating. Coating is defined here as flat applied layers of all types, especially paints, lacquers, sealants, undercoats and primers, as described in the preceding. The epoxy resin composition described is especially advantageously usable in coatings that are intended to have particularly high resistances, especially with regard to mechanical stress, moisture, effects of water and/or salts, fecal matter, chemicals or foods.

As a coating, the epoxy resin composition is advantageously used in a coating method in which it has a liquid consistently with low viscosity and good flow properties, and especially can be applied as a self-leveling coating on predominantly flat surfaces or as a paint. Preferably the epoxy resin composition in this application immediately after the mixing of the resin and hardener components has a viscosity, measured at 20° C., in the range of 300 to 4000 mPa·s, preferably in the range of 300 to 3000 mPa·s, especially in the range of 300 to 2000 mPa·s. The mixed composition is applied superficially within the processing time as a thin film with a layer thickness typically of about 50 μm to about 5 mm on a substrate, typically at ambient temperature. The application takes place, for example, by casting onto the substrate. In this process the composition in the liquid state is distributed uniformly, for example with the aid of a doctor blade or a serrated trowel. In addition, the distributed composition can be leveled and deaerated with a spiked roller. However, the application may also be done manually using brushes or rollers or as a spray application, for example as a corrosion protection coating on steel. During hardening, largely clear, lustrous and non-tacky films with high hardness and good resistance typically form, which exhibit good adhesion on a great variety of substrates. The hardeners described make available epoxy resin coatings which even under the most unfavorable reaction conditions, i.e., those that promote blushing, especially at low hardening temperatures in the range of 5 to 10° C. and high atmospheric humidity, harden to form high-quality films.

An additional object of the invention is an article containing a hardened composition, obtained by hardening the epoxy resin composition described. The hardened composition especially exists in the form of a coating in this case.

The epoxy resin composition described is characterized by advantageous properties. It has little odor and is liquid and readily workable at ambient temperature even without additional nonincorporatable diluents. It hardens surprisingly rapidly and without unwanted blushing effects, especially also under cold and humid conditions. In this process, highly hydrophobic, highly cross-linked compositions of high hardness and excellent resistances form. In particular, low-emission, rapid-hardening coatings that can be applied at ambient temperature can be obtained, which in the hardened state have high hardnesses, high cross-linking density, high hydrophobicity and very high resistances.

EXAMPLES

In the following, exemplary embodiments are presented to explain the invention described in greater detail. Naturally the invention is not limited to these exemplary embodiments described.

1. Description of Measurement Methods

The amine content, i.e., the total content of amino groups in the compounds produced, was determined titrimetrically (with 0.1 N $HClO_4$ in glacial acetic acid using a crystal violet indicator) and is always given in mmol N/g.

Infrared spectra (FT-IR) recorded on the undiluted films on a Perkin-Elmer 1600FT-IR apparatus equipped with a horizontal ATR measuring unit with a ZnSe crystal; the absorptions bands are reported in wave numbers ($cm^{-1}$) (measurement window: 4000-650 $cm^{-1}$).

The viscosity was measured on a Rheotec RC30 thermostatically controlled cone-and-plate viscometer (cone diameter 50 mm, cone angle 1°, cone tip-plate distance 0.05 mm, shear rate 10-100 s$^{-1}$).

Mass spectra (FIMS) were measured on a Thermo Scientific LTQ Orbitrap XL high-resolution mass spectrometer in that 500 μl of the sample dissolved in methanol (100 μg/ml) were injected directly into the mass spectrometer at an injection rate of 10 μl/min and a flow rate of the carrier (0.1% formic acid in methanol) of 400 μl/min; detection was performed by electrospray ionization (ESI$^+$).

2. Substances Used

MXDA 1,3-bis-(aminomethyl)benzene

IPDA: 1-amino-3-aminomethyl-3,5,5-trimethylcyclohexane (=Isophorone diamine)

Jeffamine® D-230: Polypropylene glycol diamine, mean molecular weight approx. 240 g/mol, amine content approx. 8.29 mmol N/g, (from Huntsman)

TETA Triethylenetetramine (technical grade, amine content approx. 25.7 mmol N/g)

DB-MXDA N,N'-dibenzyl-1,3-bis-(aminomethyl)benzene, prepared from 21.2 g benzaldehyde and 13.6 g 1,3-bis-(aminomethyl)benzene according to the general manufacturing specification for reductive alkylation; amine content 6.41 mmol N/g DEDTA
Mixture containing 3,2-diethyltoluoylene-2,4- and -2,6-diamine, Ethacure® 100 (from Albermale)

Araldite® GY 250: Bisphenol—A diglycidyl ether; epoxy-equivalent approx. 187.5 g/Eq, (from Huntsman)

Araldite® DY-E: Monoglycidyl ether of a $C_{12}$-bis $C_{14}$-Alkohols; epoxy-Equivalent approx. 290 g/Eq, (from Huntsman)

Ancamine® K 54: 2,4,6-tris-(dimethylaminomethyl)phenol (from Air Products)

3. Preparation of Hardeners

General Manufacturing Procedure for Reductive Alkylation

In a round-bottom flask, the aldehyde and an amine were dissolved in a sufficient quantity of isopropanol under a nitrogen atmosphere. The solution was agitated for 30 minutes at room temperature and then hydrogenated at a hydrogen pressure of 80 bar, a temperature of 80° C. and a flow rate of 3 ml/min on a continuously operating hydrogenation apparatus with a Pd/C-fixed bed catalyst. To follow the reaction, IR spectroscopy was used to check whether the imine band at approx. 1665 cm$^{-1}$ had disappeared. Then the solution was concentrated under vacuum at 80° C.

Hardener H1:
1,3-bis-3'-aminobenzyl-aminomethyl)benzene 30.2 g 3-pyridine-nitrobenzaldehyde and 13.6 g MXDA were reacted using the general manufacturing procedure for reductive alkylation. A clear, yellowish oil with a viscosity of 41,000 mPa·s at 20° C. and an amine content of 11.32 mmol N/g was obtained.

FT-IR: 3336, 3198, 3025, 2829, 1601, 1457, 1290, 1162, 993, 862, 772, 689

FIMS: m/z=347.22369 (100, [MH$^+$]; theoretical mass for $C_{22}H_{27}N_4^+$: 347.22302).

Hardener H2
21.2 g 3-nitrobenzaldehyde and 13.6 g MXDA were reacted using the general manufacturing procedure for reductive alkylation. A clear, yellow oil with a viscosity of 11,890 mPa·s at 20° C. and an amine content of 12.25 mmol N/g was obtained.

FT-IR: 3326, 3198, 3022, 2839, 1457, 1288, 1162, 992, 862, 772, 689

Hardener H3
A mixture of 15.1 g 3-nitrobenzaldehyde and 10.7 g 3-pyridine-carbaldehyde was reacted with MXDA using the general manufacturing procedure for reductive alkylation. A clear, yellow oil with a viscosity of 11,790 mPa·s at 20° C. and an amine content of 11.07 mmol N/g was obtained.

FT-IR: 3319, 3191, 3025, 2900, 2810, 1723, 1601, 1459, 1421, 1288, 1098, 777, 694

Hardener H4
N,N'-bis-(pyridin-3-ylmethyl)-1,5-diamino-2-methylpentane 30.2 g 3-nitrobenzaldehyde and 11.6 g 1,5-diamino-2-methylpentane were reacted using the general manufacturing procedure for reductive alkylation. A clear, slightly yellowish oil with a viscosity of 6600 mPa·s at 20° C. and an amine content of 12.29 mmol N/g was obtained.

FT-IR: 3340, 3200, 3032, 2842, 2811, 1601, 1489, 1457, 1293, 1164, 993, 867, 776, 693

Hardener H5
N,N'-Bis-(3'-aminobenzyl)-1-amino-3-aminomethyl-3,5,5-trimethylcyclohexane 30.2 g 3-nitrobenzaldehyde and 17.0 g IPDA were reacted using the general manufacturing procedure for reductive alkylation. A clear, dark yellow oil with a viscosity of 3060 mPa·s at 60° C. and an amine content of 7.79 mmol N/g was obtained.

FT-IR: 3350, 2948, 2909, 2865, 2840, 1643, 1616, 1602, 1527, 1492, 1461, 1382, 1348, 1313, 1295, 1162, 1093, 995, 948, 927, 865, 828, 807, 775, 735, 690, 676

Hardener H6
N,N'-bis-(3'-aminobenzyl)polypropyleneglycol diamine 30.2 g 3-nitrobenzaldehyde and 24.0 g Jeffamine® D-230 were reacted using the general manufacturing procedure for reductive alkylation. A clear, dark yellow oil with a viscosity of 23,600 mPa·s at 20° C. and an amine content of 8.60 mmol N/g was obtained.

FT-IR: 3352, 3213, 3034, 2967, 2927, 2866, 1603, 1590, 1491, 1461, 1373, 1332, 1295, 1092, 994, 864, 774, 693

Hardener H7
30.2 g 3-nitrobenzaldehyde and 18.4.0 g TETA were reacted using the general manufacturing procedure for reductive alkylation. A clear, dark yellow oil with a viscosity of 61,100 mPa·s at 20° C. 660 mPa·s at 60° C. and an amine content of 16.47 mmol N/g was obtained.

FT-IR: 3212, 3195, 3032, 2930, 2885, 2812, 1602, 1588, 1490, 1459, 1354, 1293, 1162, 1111, 994, 864, 773, 693

Hardener H8
N-(3-aminobenzyl)-1-(pyridin-3-ylmethylyl)methanamine 15.1 g 3-nitrobenzaldehyde and 10.8 g 3-aminoethylpyridine were reacted using the general manufacturing procedure for reductive alkylation. A clear, yellow oil with a viscosity of 5140 mPa·s at 20° C. and an amine content of 13.61 mmol N/g was obtained.

FT-IR: 3329, 3205, 3032, 2825, 1601, 1495, 1455, 1421, 1312, 1298, 1164, 1105, 1024, 776, 691

Hardener H9
N,3'-aminobenzyl)benzylamine 15.1 g 3-nitrobenzaldehyde and 10.7 g benzylamine were reacted using the general manufacturing procedure for reductive alkylation. A clear, yellow oil with a viscosity of 320 mPa·s at 20° C. and an amine content of 9.10 mmol N/g was obtained.

FT-IR: 3361, 3202, 3025, 2815, 1601, 1490, 1452, 1290, 1164, 1090, 995, 870, 790, 740, 691

4. Preparation of Epoxy Resin Compositions
For each example the constituents listed in Table 1 were mixed in the indicated quantities (in parts by weight) using a centrifugal mixer (SpeedMixer™ DAC 150, FlackTek Inc.). 10 minutes after mixing in each case the viscosity of the composition at 20° C. was determined ("viscosity (10')"). In addition in each case a first film in a layer thickness of 500 μm was drawn on a glass plate and this was stored or hardened at 23° C. and 50% relative humidity (=standard climate, designated by "NC" for short in the following). After 4 weeks the appearance of the film was assessed (designated in the tables by "Appearance (NC)"). The term "good" was applied to a film that was clear, sometimes yellowish, and had a hard, lustrous and non-tacky surface without a structure. The term "structure" was applied to any type of markings or pattern on the surface. In addition, the König [Konig] hardness (pendulum hardness according to König) of the films according to DIN EN ISO 1522) was measured after 2 days ("König hardness (NC) (2d)") or after 4 days ("König hardness (NC) (4d)") or after 7 days ("König hardness (NC) (7d)") or after 4 weeks ("König hardness (NC) (4w)"). Furthermore in each case a second film in a layer thickness of 500 μm was drawn on a glass plate immediately after application and this was held for 7 days at 8° C. and 80% relative humidity and then for 4 weeks under NC, or hardened. Then the appearance of these films was evaluated (designated in the tables by "Appearance (8°/80%)") in the same manner as for the Appearance (NC). The König hardness was also determined on the films hardened in this way, in each case after 7 days at 8° C. and 80% relative humidity (König hardness (8° 180%) (7d cold)"), then after an additional 2 days under NC (König hardness (8° 180%) (+2d NC)") or 7 days under NC (König hardness (8°/80%) (+7d NC)") or 4 weeks under NC (König hardness (8°/80%) (+4w NC)").

The results are presented in Table 1.

TABLE 1

Composition and properties of compositions Z1 to Z12 and comparison composition ZV1

| | Composition | | | | | | |
|---|---|---|---|---|---|---|---|
| | Z1 | Z2 | Z3 | Z4 | Z5 | Z6 | Z7 |
| Araldite ® GY-250 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 |
| Hardener | H1, 57.7 | H1, 41.0 | H2, 47.8 | H2, 39.4 | H3, 66.5 | H4, 54.4 | H4, 40.8 |
| MXDA | — | 6.8 | — | — | — | — | — |
| DB-MXDA | — | — | — | 39.6 | — | — | 39.6 |
| Ancamine ® K 54 | 5.1 | 4.9 | 5.0 | 5.6 | 5.3 | 5.1 | 5.6 |
| Viscosity. (10') [Pa · s] | 3.5 | 2.2 | 2.5 | 1.6 | 1.7 | 2.1 | 0.9 |
| König hardness [s] | | | | | | | |
| (NC)  (2 d) | 90 | 105 | 118 | 108 | 116 | 102 | 70 |
|       (4 d) | 171 | 164 | 181 | 160 | 200 | 165 | 141 |
|       (7 d) | 204 | 193 | 207 | 188 | 209 | 190 | 171 |
|       (4 w) | 224 | 217 | 228 | 219 | 216 | 224 | 223 |
| Appearance (NC) | good | good | good | good | good | good | good |
| König h · [s] (7 d cold) (+2 d NC) | 52 | 50 | 74 | 62 | 164 | 18 | 21 |
| (8°/80%) (+7 d NC) (+4 w NC) | n.b. | n.b. | 166 | 88 | n.b. | 120 | 98 |
| | 192 | 174 | n.b. | n.b. | 211 | n.b. | n.b. |
| | 204 | 185 | 207 | 182 | 215 | 224 | 203 |
| | 220 | 204 | 216 | 205 | 227 | 229 | 221 |
| Appearance (8°/80%) | good | good | good | good | good | good | good |

TABLE 1-continued

Composition and properties of compositions Z1 to Z12 and comparison composition ZV1

| | Composition | | | | | |
|---|---|---|---|---|---|---|
| | Z8 | Z9 | Z10 | Z11 | Z12 | ZV1 (Comp.) |
| Araldite ® GY-250 | 167.2 | 167.2 | 167.2 | 167.2 | 167.2 | 167.2 |
| Araldite ® DY-E | 31.8 | 31.8 | 31.8 | 31.8 | 31.8 | 31.8 |
| Hardener (type, amount) | H6, 76.4 | H7, 44.6 | H7, 26.7 | H8, 53.3 | H9, 70.8 | — |
| Jeffamine ® D-230 | — | — | 24.0 | — | — | — |
| DEDTA | — | — | — | — | — | -44.6- |
| Ancamine ® K 54 | 5.7 | 5.7 | 5.5 | 5.7 | 6.0 | 4.9 |
| Viscosity (10') [Pa · s] | 6.3 | 3.6 | 1.0 | 1.54 | 0.65 | 1.0 |
| König hardness [s] | | | | | | |
| (NC)  (2 d) | 55 | 106 | 126 | 77 | 17 | n.m. |
|       (4 d) | 154 | 125 | 165 | 190 | 104 | n.m. |
|       (7 d) | 190 | 144 | 189 | 213 | 167 | 88 |
|       (4 w) | 210 | 153 | 211 | 211 | 211 | 210 |
| Appearance (NC) | good | good | good | good | good | good |
| König h · [s] | 24 | n.d. | 14 | 176 | 17 | n.m. |
| (7 d cold) (+2 d NC) | 105 | | 53 | 195 | 95 | n.m. |
| (8°/80%) (+7 d NC) | n.b. | | 80 | 201 | 154 | n.m. |
| (+4 w NC) | 172 | 83 | 202 | 185 | 120 | |
| | 204 | 150 | 207 | 227 | 220 | |
| Appearance (8°/80%) | good | n.d. | dull | good | good | good |

"Com." stands for "comparison,"
"König h." stands for "König hardness",
"n.m." stands for "not measurable" (too tacky),
"n.b." stands for "not determined";

The invention claimed is:

1. A hardener, suitable for hardening epoxy resins, containing at least one amine with at least one amino group of formula (I),

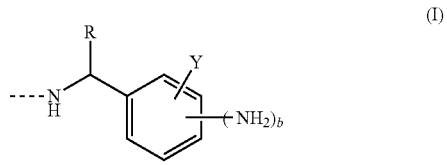

(I)

where
R represents a hydrogen atom or an alkyl group with 1 to 12 C atoms;
Y represents
 a hydrogen atom,
 a monovalent hydrocarbon group with 1 to 12 C atoms,
 an alkoxy with 1 to 12 C atoms, or
 aryloxy group with 1 to 12 C atoms; and
b represents 1 or 2;
wherein the amine with at least one amino group of formula (I) is an amine of formula (II),

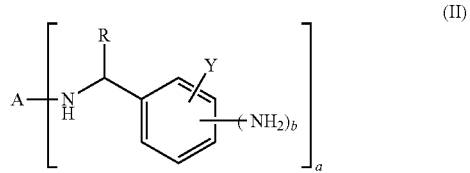

(II)

where
A represents an a-valent hydrocarbon moiety, which does not contain hydroxyl groups, with a molecular weight in the range of 28 to 5000 g/mol, and optionally contains ether groups, amino groups, or mercapto groups; and
a represents an integer from 1 to 3.

2. The hardener according to claim 1, wherein the amine with at least one amino group of formula (I) has two or three amino groups of formula (I).

3. The hardener according to claim 1, wherein the R represents a hydrogen atom or a methyl group.

4. The hardener according to claim 1, wherein b represents 1.

5. The hardener according to claim 1, wherein Y represents a hydrogen atom or a methyl group.

6. The hardener according to claim 1, wherein Y represents a hydrogen atom and b represents 1 and the primary amino group is in meta-position.

7. The hardener according to claim 1, wherein A represents an a-valent hydrocarbon moiety with a molecular weight in the range of 28 to 500 g/mol, which optionally contains
ether groups,
primary amino groups, or
secondary amino groups.

8. The hardener according to claim 1, wherein A represents either an a-valent alkyl, cycloalkyl or arylalkyl radical with 2 to 20 C atoms or an a-valent polyalkyleneamine radical with 1 to 10 secondary amino groups or an a-valent polyalkylene moiety with 1 to 7 ether groups, wherein these moieties contain one or two primary or secondary aliphatic amino groups.

9. A method for producing a hardener, the hardener suitable for hardening epoxy resins and containing at least one amine with at least one amino group of formula (I),

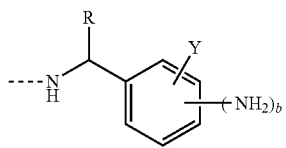

(I)

in which
the amine with at least one amino group of formula (I) is obtained by reductive alkylation of at least one primary amine with at least one carbonyl compound of formula (III),

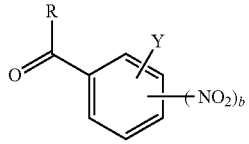

(III)

wherein, in formulas (I) and (III),
R represents a hydrogen atom or an alkyl group with 1 to 12 C atoms;
Y represents
a hydrogen atom,
a monovalent hydrocarbon group with 1 to 12 C atoms,
an alkoxy with 1 to 12 C atoms, or
aryloxy group with 1 to 12 C atoms; and
b represents 1 or 2.

10. A method comprising hardening at least one epoxy resin with the hardener according to claim 1.

11. An epoxy resin composition containing at least one epoxy resin and at least one hardener according to claim 1.

12. The epoxy resin composition according to claim 11, wherein the epoxy resin composition is a two-component composition consisting of a resin component and a hardener component, wherein the epoxy resin is a constituent of the resin component and the hardener is a constituent of the hardener component.

13. A hardened composition obtained from the hardening of the epoxy resin composition according to claim 11.

14. An article containing a hardened composition according to claim 13.

* * * * *